(12) United States Patent
Noh et al.

(10) Patent No.: US 11,409,081 B2
(45) Date of Patent: Aug. 9, 2022

(54) SMALL LENS SYSTEM INCLUDING SEVEN LENSES OF ++−+++− OR −+−+++− REFRACTIVE POWERS

(71) Applicant: SEKONIX CO., LTD., Gyeonggi-do (KR)

(72) Inventors: Ki Youn Noh, Gyeonggi-do (KR); Soon Cheol Choi, Gyeonggi-do (KR); Seong Jun Bae, Gyeonggi-do (KR); Su Jeong Kim, Gyeonggi-do (KR)

(73) Assignee: SEKONIX CO., LTD.

( * ) Notice: Subject to any disclaimer, the term of this patent is extended or adjusted under 35 U.S.C. 154(b) by 481 days.

(21) Appl. No.: 16/728,453

(22) Filed: Dec. 27, 2019

(65) Prior Publication Data
US 2021/0124149 A1    Apr. 29, 2021

(30) Foreign Application Priority Data

Oct. 28, 2019  (KR) .......................... 10-2019-0134255

(51) Int. Cl.
*G02B 13/00*  (2006.01)
*G02B 9/64*  (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

2021/0063698 A1*  3/2021  Lyu .................... G02B 27/0025
2022/0019059 A1*  1/2022  Kamebuchi ........ G02B 27/0025

* cited by examiner

*Primary Examiner* — Wen Huang
(74) *Attorney, Agent, or Firm* — Mendelsohn Dunleavy, P.C.

(57) ABSTRACT

Disclosed is a small lens system including a first lens, a second lens, a third lens, a fourth lens, a fifth lens, a sixth lens, and a seventh lens sequentially arranged from an object, wherein the first lens has a convex surface facing the object, the second lens has a convex surface facing the object and a positive refractive power, the third lens has a positive or negative refractive power, the fourth lens has opposite surfaces convex toward an image, the fifth lens has opposite surfaces convex toward the image, the sixth lens has at least one aspherical surface and is configured such that the object-side surface of the sixth lens is convex in the vicinity of an optical axis, and the seventh lens has at least one aspherical surface and is configured such that at least one inflection point is provided on the aspherical surface of the seventh lens.

26 Claims, 12 Drawing Sheets

PRIOR ART

SMALL LENS SYSTEM INCLUDING SEVEN LENSES OF ++−+++− OR −+−+++− REFRACTIVE POWERS

BACKGROUND OF THE INVENTION

Field of the Invention

The present invention relates to a wide-angle lens system including a total of seven lenses, and more particularly to a small wide-angle lens system configured such that the lens system is small and lightweight by appropriately designing the refractive powers, shapes, etc. of the lenses and such that high-resolution images can be provided by correcting distortion, whereby it is possible to obtain wide-angle images.

Description of the Related Art

Recent mobile terminals are equipped with a camera, with which it is possible to perform video communication and to take photographs. In addition, as the number of functions of the camera in the mobile terminal gradually increases, demand for high resolution and wide angle of a camera for mobile terminals has gradually increased, and there is a trend toward miniaturization of the camera such that the mobile terminal can be easily and conveniently carried.

In recent years, a lens of the camera has been made of a plastic material, which is lighter than glass, in order to realize high quality, high performance, and miniaturization of the camera, and a lens system has been configured using six or more lenses in order to realize high resolution.

Particular, for a small lens mounted in a smartphone, it is advantageous to reduce the length of the lens system (total track length) as much as possible due to limitation in the thickness of the smartphone.

FIG. 1 shows a lens system disclosed in U.S. Pat. No. 9,606,328. In the lens system shown in FIG. 1, each of a second lens and a sixth lens is a lens having a positive refractive index. However, the ratio TTL/ImagH of the distance TTL between the front surface of a lens and an image surface to the height ImagH of the image surface, which is related to the length of the lens, is 1.7. Consequently, the length of the lens is long (i.e. the smaller the TTL/ImagH value, the shorter the length of the lens), whereby the lens system is limited in application to a thin smartphone.

In the case in which TTL is shortened in order to reduce the TTL/ImagH value, however, the tolerance of the lens system becomes sensitive, whereby there is high possibility of occurrence of design errors.

SUMMARY OF THE INVENTION

The present invention has been made in view of the above problems, and it is an object of the present invention to provide a small wide-angle lens system configured such that the lens system is small and lightweight by appropriately designing the refractive powers, shapes, etc. of the lenses and such that high-resolution images can be provided by correcting distortion.

In accordance with an aspect of the present invention, the above and other objects can be accomplished by the provision of a small lens system including a first lens, a second lens, a third lens, a fourth lens, a fifth lens, a sixth lens, and a seventh lens sequentially arranged from an object, wherein the first lens is a meniscus lens having a convex surface facing the object, the second lens is a meniscus lens having a convex surface facing the object and a positive refractive power, the third lens is a meniscus lens having a positive or negative refractive power, the fourth lens is a meniscus lens having opposite surfaces convex toward an image, the fifth lens is a meniscus lens having opposite surfaces convex toward the image, the sixth lens is a lens having at least one aspherical surface and configured such that the object-side surface of the sixth lens is convex in the vicinity of an optical axis, and the seventh lens is a lens having at least one aspherical surface and configured such that a single inflection point or a plurality of inflection points is provided on the aspherical surface of the seventh lens, and wherein the ratio of the center thickness (ct1) to the effective-diameter outermost thickness (et1) of the first lens satisfies $1.0<ct1/et1<1.8$, and the refractive power (P1) of the first lens satisfies $-0.01<P1<0.01$.

In accordance with another aspect of the present invention, there is provided a small lens system including a first lens, a second lens, a third lens, a fourth lens, a fifth lens, a sixth lens, and a seventh lens sequentially arranged from an object, wherein the first lens is a meniscus lens having a convex surface facing the object, the second lens is a meniscus lens having a convex surface facing the object and a positive refractive power, the third lens is a meniscus lens having a positive or negative refractive power, the fourth lens is a meniscus lens having opposite surfaces convex toward an image, the fifth lens is a meniscus lens having opposite surfaces convex toward the image, the sixth lens is a lens having at least one aspherical surface and configured such that the object-side surface of the sixth lens is convex in the vicinity of an optical axis, and the seventh lens is a lens having at least one aspherical surface and configured such that a single inflection point or a plurality of inflection points is provided on the aspherical surface of the seventh lens, and wherein the ratio of the center thickness (ct1) to the effective-diameter outermost thickness (et1) of the first lens satisfies $1.0<ct1/et1<1.8$, the refractive power (P1) of the first lens satisfies $-0.01<P1<0.01$, and the angle of incidence (AOI) that an ordinary ray of a field forms with a normal line at a point of the image-side surface of the seventh lens through which the ordinary ray passes satisfies $AOI<11°$.

The ratio of the distance (TTL) between the object-side surface of the first lens and an image surface to the image height (ImagH) of the small lens system may satisfy $1.0<TTL/ImagH<1.5$.

In addition, the absolute value of the ratio of the composite focal distance (f1234) of the first lens, the second lens, the third lens, and the fourth lens to the composite focal distance (f567) of the fifth lens, the sixth lens, and the seventh lens may satisfy $0.3<|f1234/f567|<0.8$.

In addition, the sixth lens may be configured such that opposite surfaces of the sixth lens are convex toward the image in the peripheral portion thereof, and the seventh lens may be configured such that the object-side surface of the seventh lens is convex toward the object in the peripheral portion thereof and the image-side surface of the seventh lens is convex toward the image in the peripheral portion thereof.

In addition, each of the first to seventh lenses may be made of a plastic material, and all surfaces of the lenses may be aspherical surfaces.

In addition, the absolute value of the ratio of the effective-diameter outermost thickness (et6) to the center thickness (ct6) of the sixth lens may satisfy $0.5<|et6/ct6|<1.2$.

In addition, the angle (A) between the image-side surface of the fourth lens and the optical axis in the vicinity of the optical axis may satisfy $85°<A<95°$, and the angle (A)

between the object-side surface of the fifth lens and the optical axis in the vicinity of the optical axis may satisfy 85°<A<95°.

In addition, the small lens system may have a field of view greater than 70 degrees.

In addition, the absolute value of the ratio of the focal distance (f1) of the first lens to the focal distance (F) of the entire lens system may satisfy 10000<|f1/F|.

In addition, the ratio of the effective-diameter outermost distance (et12) between the first lens and the second lens to the center distance (c12) between the first lens and the second lens may satisfy 3<et12/ct12<7.

In addition, the Abbe number (V1) of the first lens, the Abbe number (V2) of the second lens, the Abbe number (V3) of the third lens, the Abbe number (V4) of the fourth lens, the Abbe number (V5) of the fifth lens, the Abbe number (V6) of the sixth lens, and the Abbe number (V7) of the seventh lens may satisfy 50<V1<60, 50<V2<60, 15<V3<30, 15<V4<30, 50<V5<60, 15<V6<30, and 50<V7<60, respectively.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

The present invention relates to a wide-angle lens system including a total of seven lenses, and more particularly to a lens system configured such that a first lens, a second lens, a third lens, a fourth lens, a fifth lens, a sixth lens, and a seventh lens are sequentially arranged from an object along an optical axis.

In addition, the present invention relates to a small wide-angle lens system configured such that the lens system is small and lightweight by appropriately designing the refractive powers, shapes, etc. of the lenses and such that the lens system has a field of view greater than 70 degrees by correcting distortion.

In particular, the present invention provides a small wide-angle lens system configured such that the overall curvature of the lens system is increased in order to reduce power, whereby the tolerance of the lens system is alleviated even though TTL is short.

In addition, the ratio of the distance between the object-side surface of the first lens and an image surface to the height of the image surface is less than 1.5, whereby it is possible to provide a lens system having a short length, which is easily applicable to a thin or small camera module, particularly a smartphone.

Figure 1:
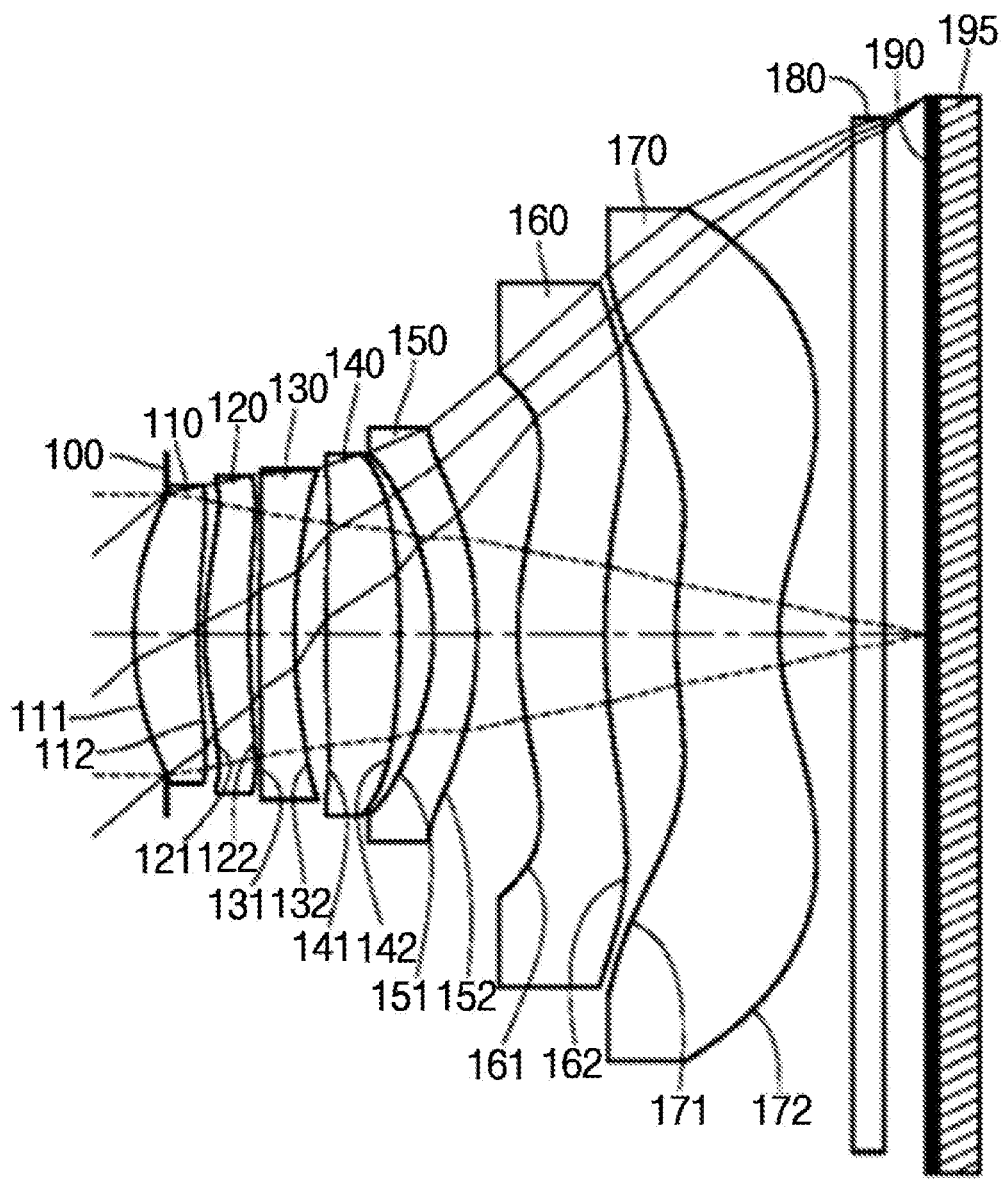
FIG. 1 is a schematic view showing a conventional small wide-angle lens system.
Figure 2:
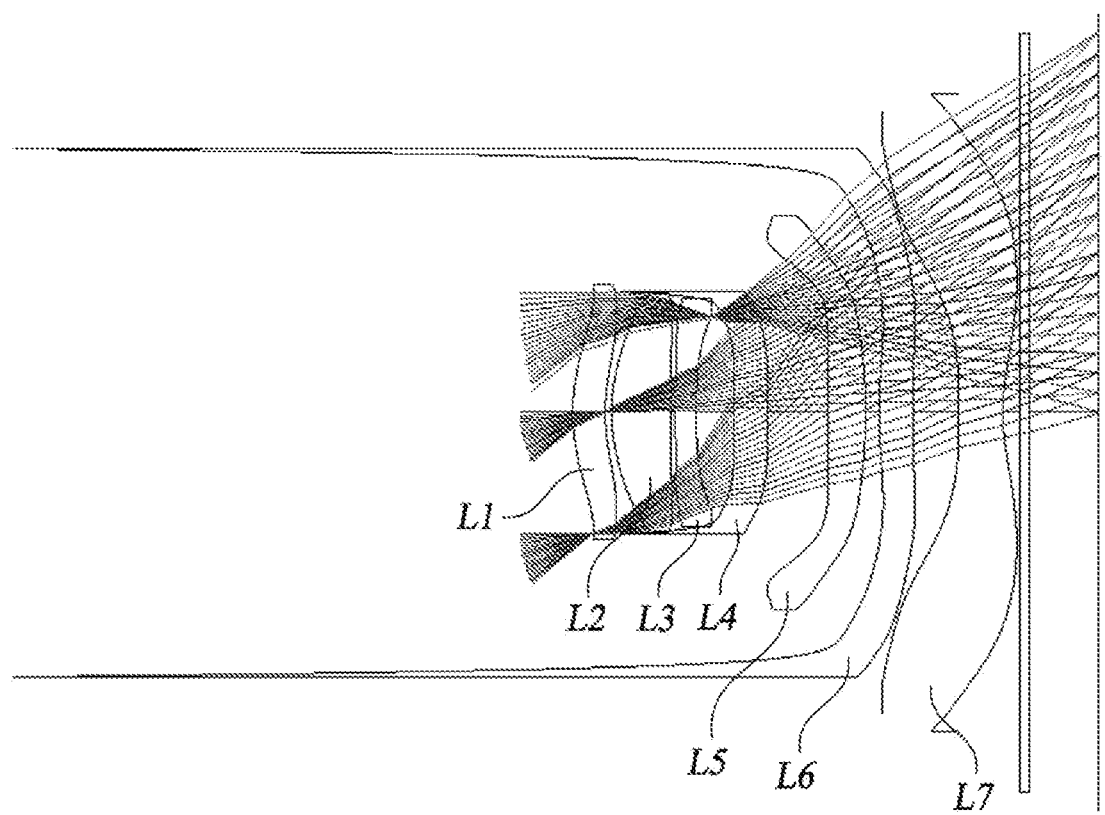
FIG. 2 is a view showing a first embodiment of a small wide-angle lens system according to the present invention.
Figure 3:
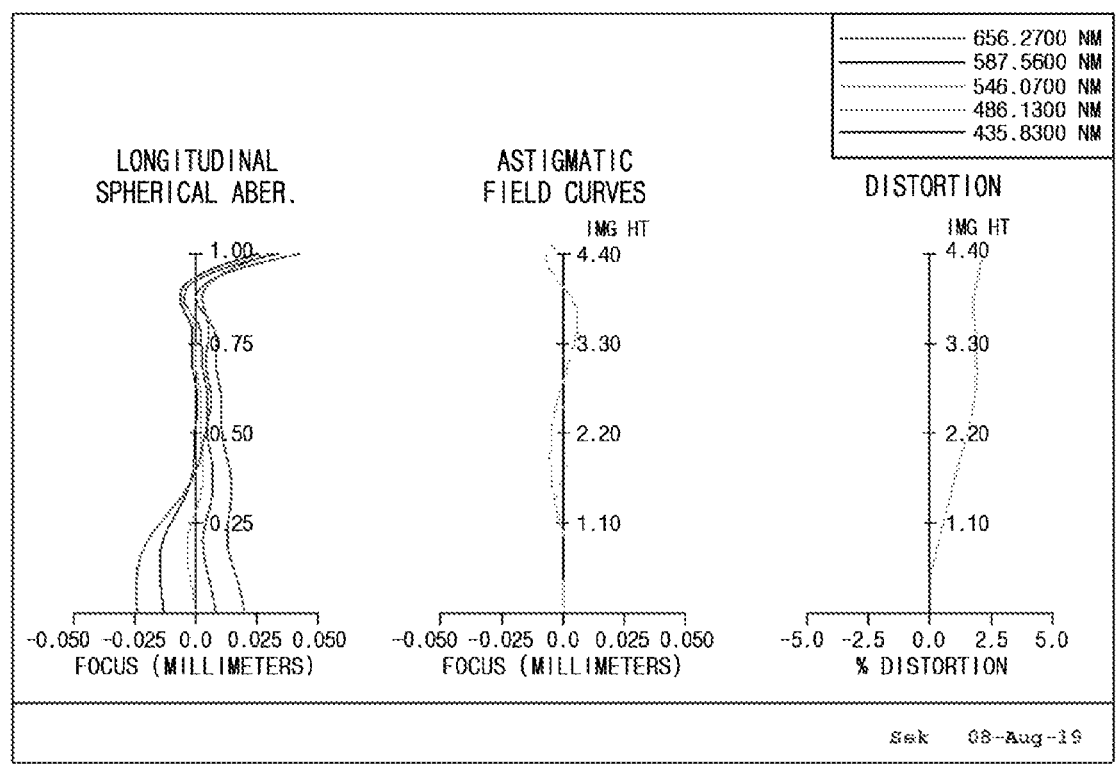
FIG. 3 is a view showing aberration according to a first embodiment of the present invention.
Figure 4:
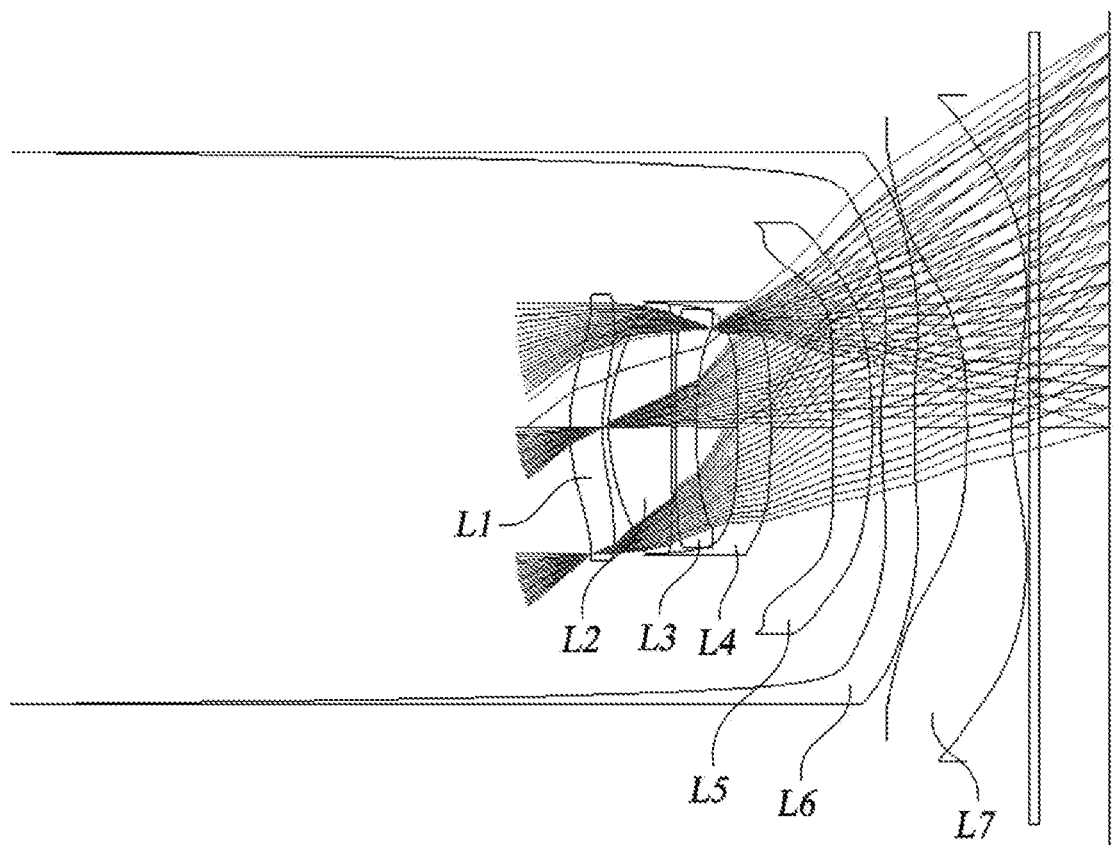
FIG. 4 is a view showing a second embodiment of the small wide-angle lens system according to the present invention.
Figure 5:
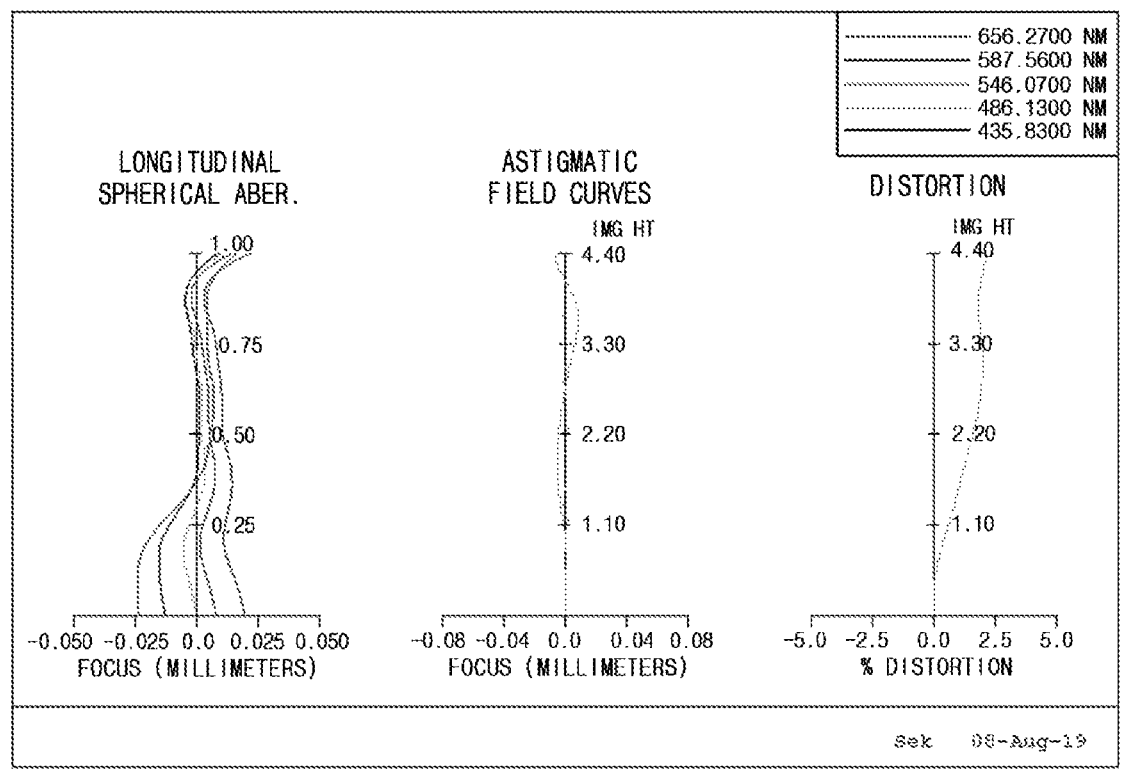
FIG. 5 is a view showing aberration according to a second embodiment of the present invention.
Figure 6:
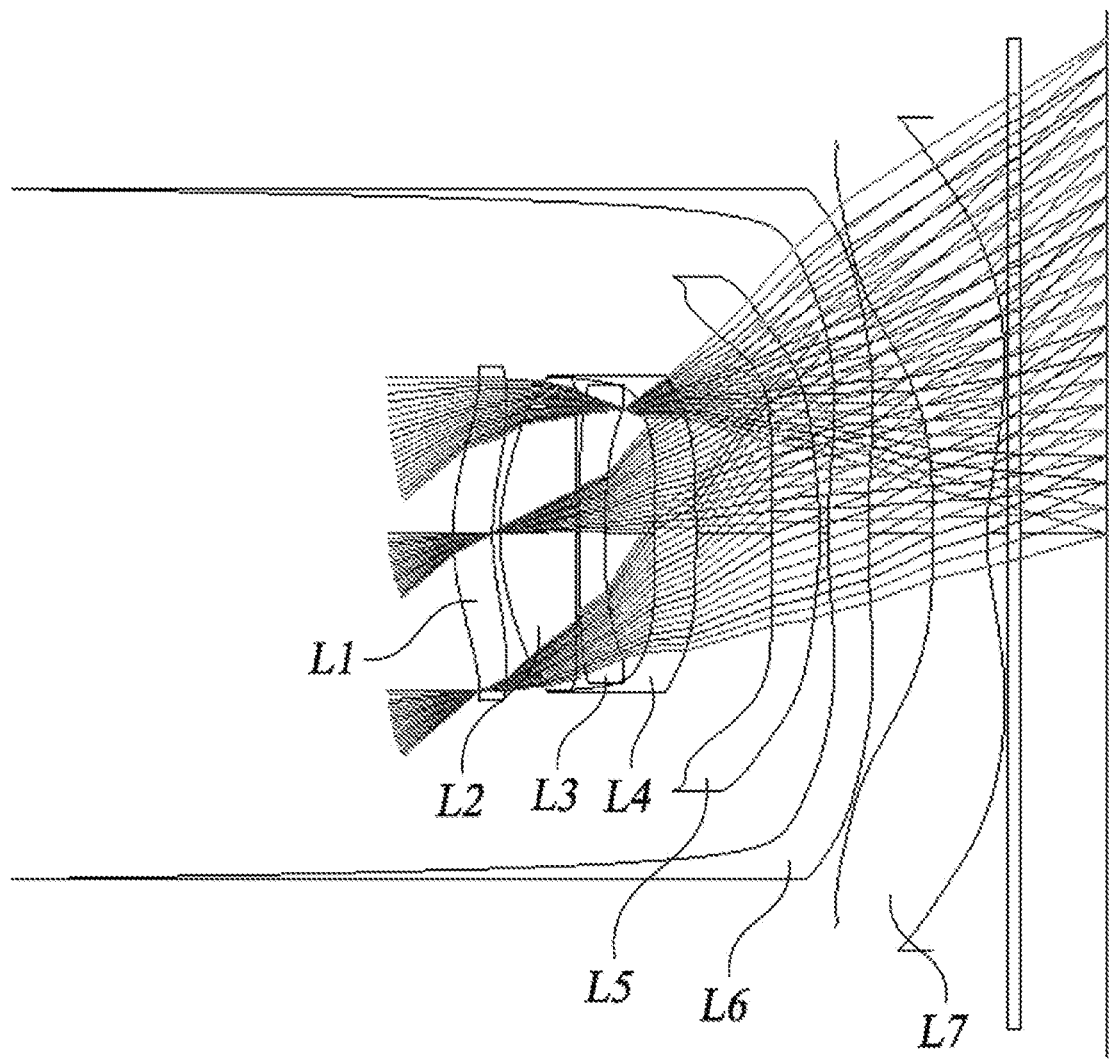
FIG. 6 is a view showing a third embodiment of the small wide-angle lens system according to the present invention.
Figure 7:
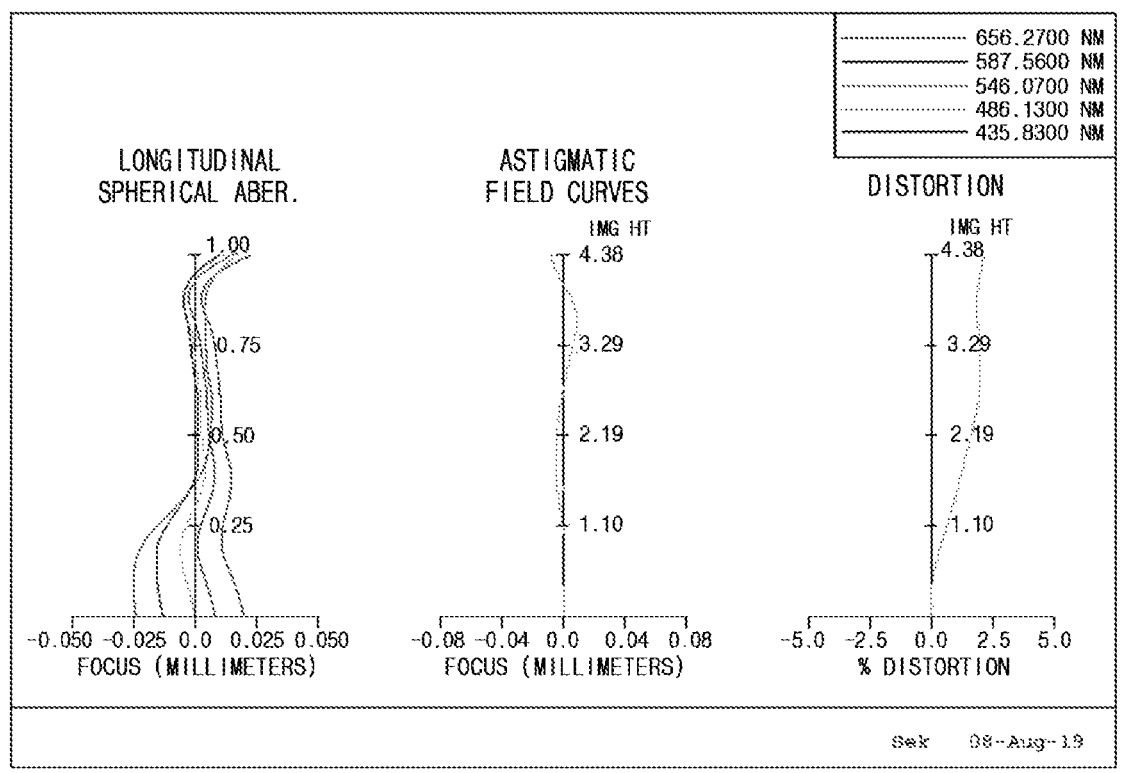
FIG. 7 is a view showing aberration according to a third embodiment of the present invention.
Figure 8:
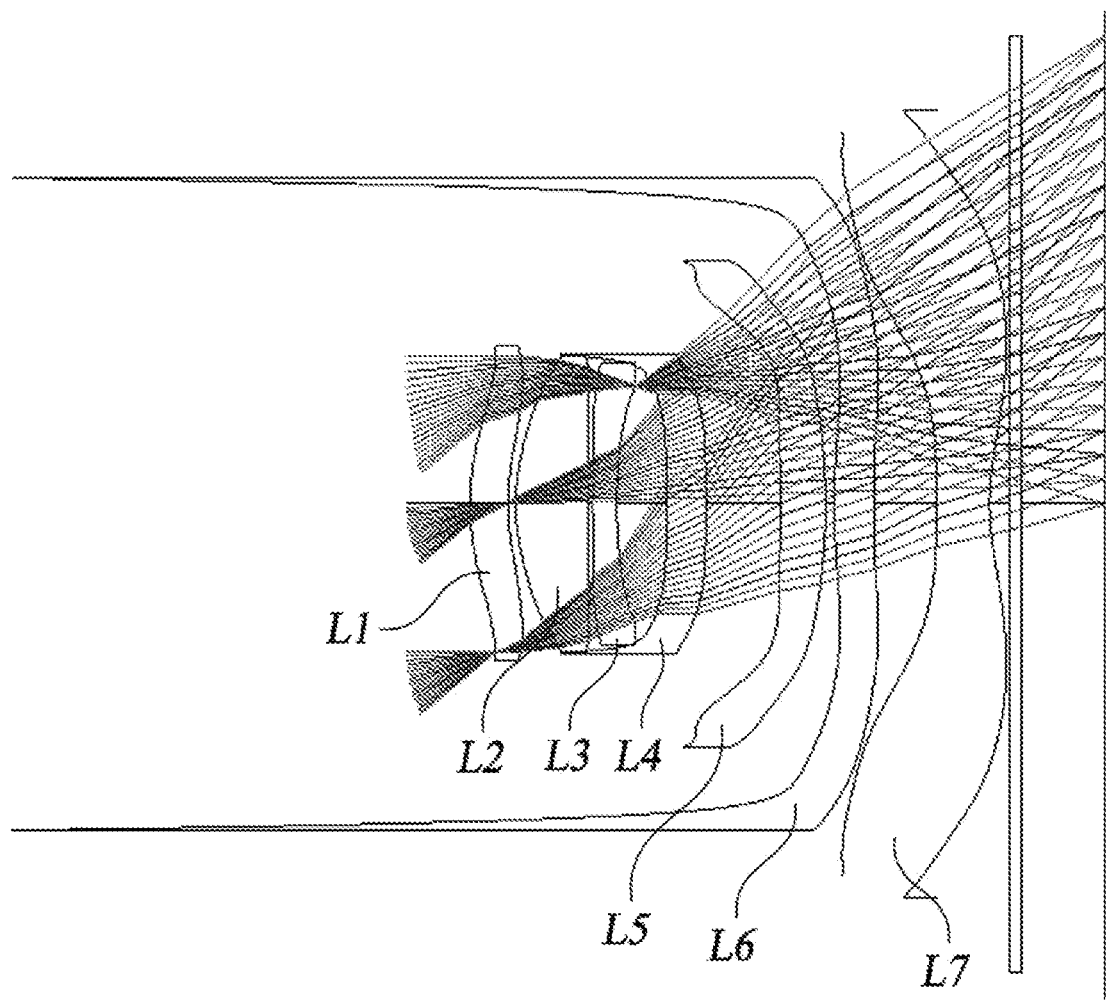
FIG. 8 is a view showing a fourth embodiment of the small wide-angle lens system according to the present invention.
Figure 9:
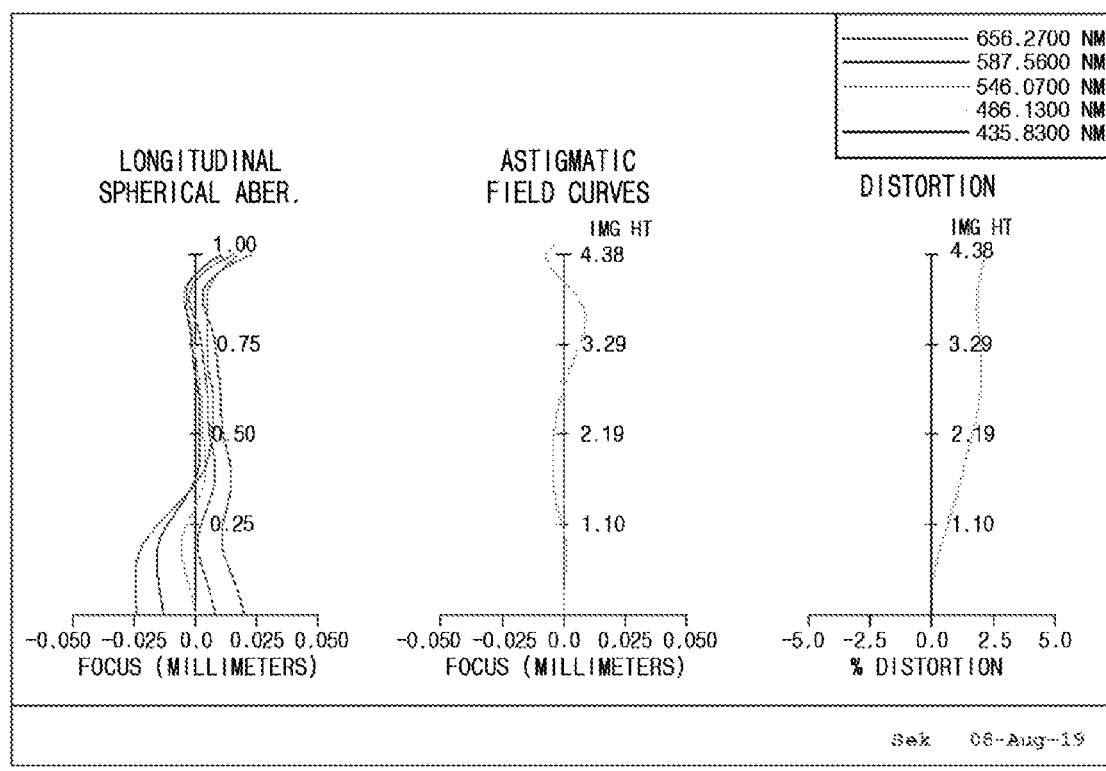
FIG. 9 is a view showing aberration according to a fourth embodiment of the present invention.
Figure 10:
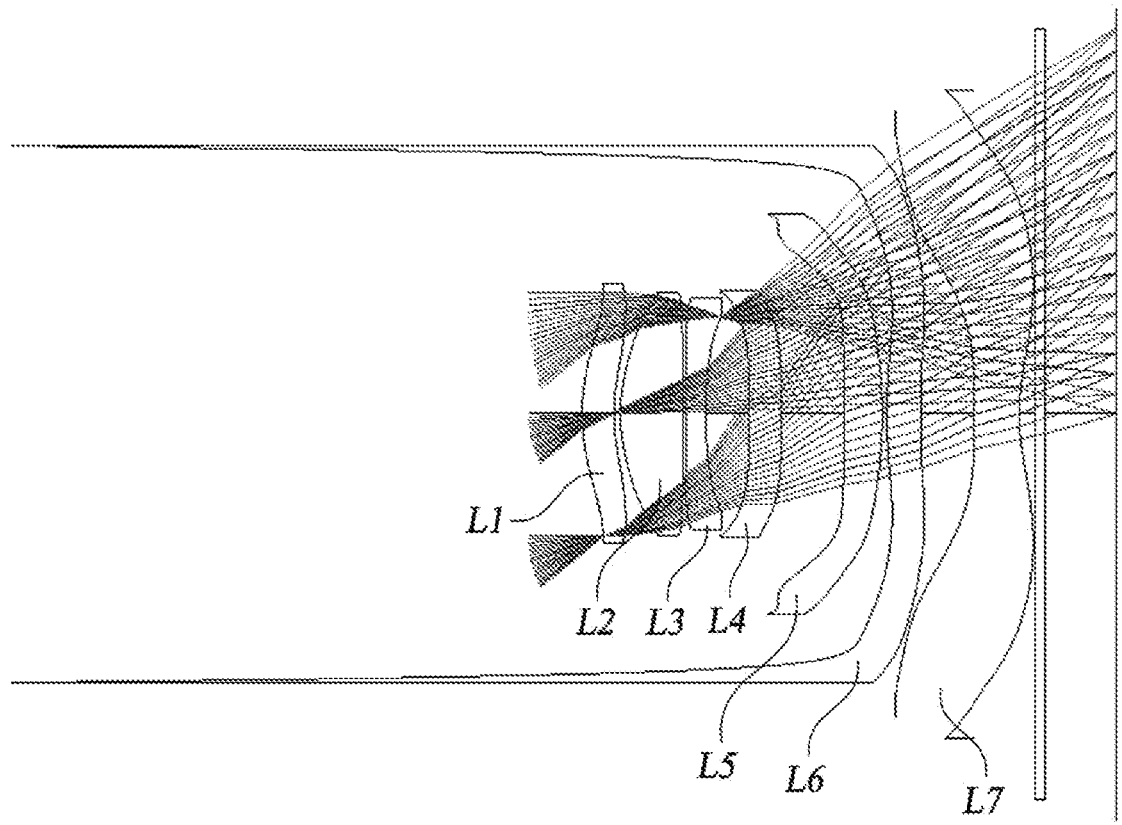
FIG. 10 is a view showing a fifth embodiment of the small wide-angle lens system according to the present invention.
Figure 11:
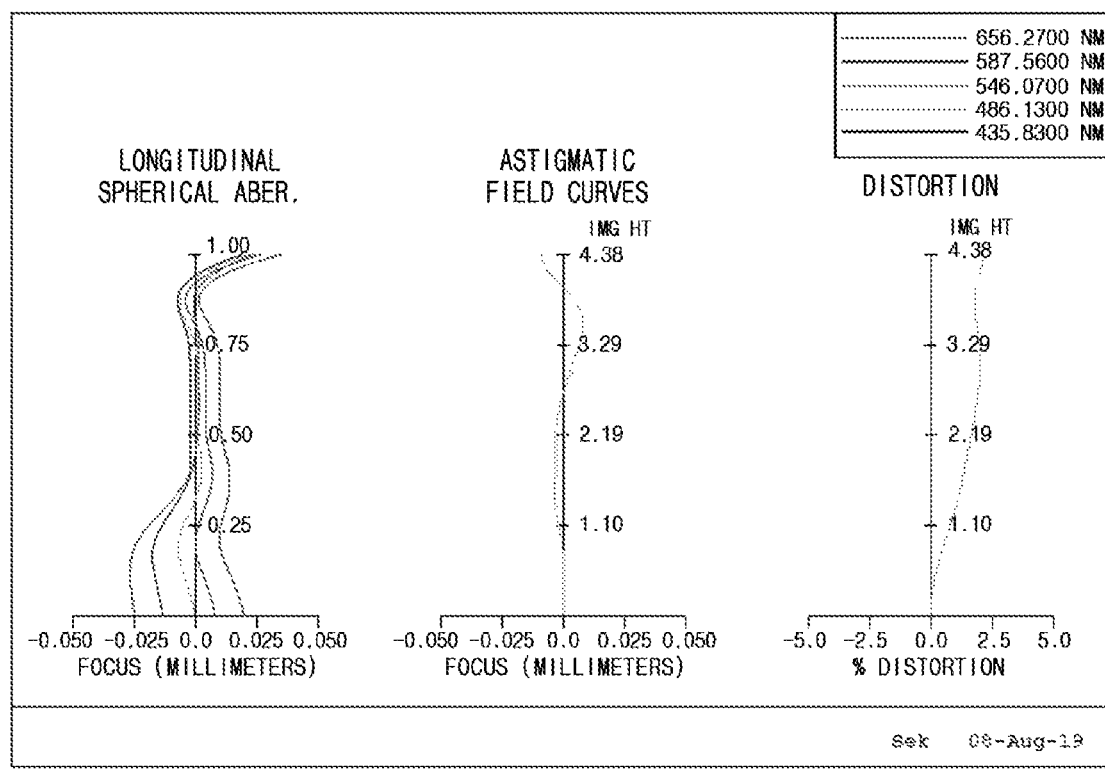
FIG. 11 is a view showing aberration according to a fifth embodiment of the present invention.
Figure 12:
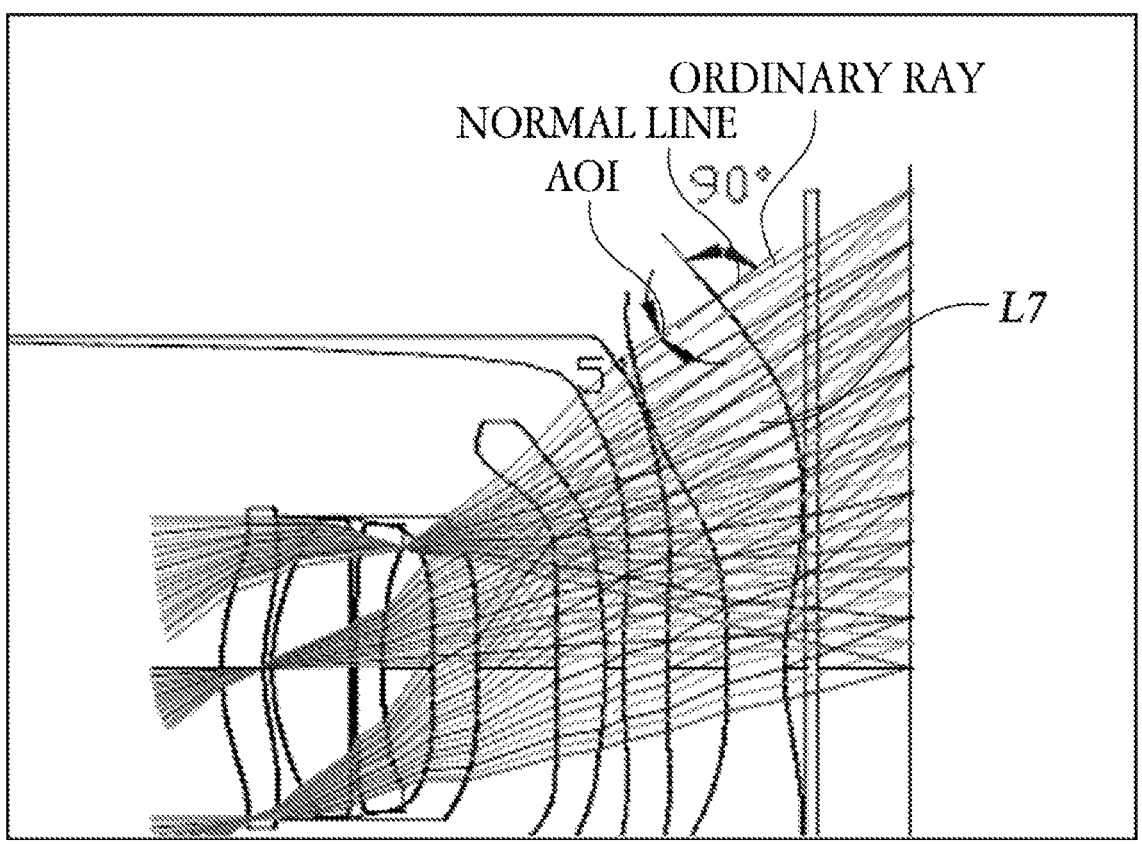
FIG. 12 is an illustrative view describing an angle of incidence (AOI) that an ordinary ray of a field forms with a normal line at a point of the image-side surface of a seventh lens through which the ordinary ray passes according to the present invention.

Hereinafter, the present invention will be described in detail with reference to the accompanying drawings. FIG. 2 is a view showing a first embodiment of a small wide-angle lens system according to the present invention, FIG. 3 is a view showing aberration according to a first embodiment of the present invention, FIG. 4 is a view showing a second embodiment of the small wide-angle lens system according to the present invention, FIG. 5 is a view showing aberration according to a second embodiment of the present invention, FIG. 6 is a view showing a third embodiment of the small wide-angle lens system according to the present invention, FIG. 7 is a view showing aberration according to a third embodiment of the present invention, FIG. 8 is a view showing a fourth embodiment of the small wide-angle lens system according to the present invention, FIG. 9 is a view showing aberration according to a fourth embodiment of the present invention, FIG. 10 is a view showing a fifth embodiment of the small wide-angle lens system according to the present invention, FIG. 11 is a view showing aberration according to a fifth embodiment of the present invention, and FIG. 12 is an illustrative view describing an angle of incidence AOI that an ordinary ray of a field forms with a normal line at a point of the image-side surface of a seventh lens L7 through which the ordinary ray passes according to the present invention.

As shown, the present invention provides a small lens system configured such that a first lens L1, a second lens L2, a third lens L3, a fourth lens L4, a fifth lens L5, a sixth lens L6, and a seventh lens L7 are sequentially arranged from an object along an optical axis, wherein the first lens L1 is a meniscus lens having a convex surface facing the object, the second lens L2 is a meniscus lens having a convex surface facing the object and a positive refractive power, the third lens L3 is a meniscus lens having a positive or negative refractive power, the fourth lens L4 is a meniscus lens having opposite surfaces convex toward an image, the fifth lens L5 is a meniscus lens having opposite surfaces convex toward the image, the sixth lens L6 is a lens having at least one aspherical surface and configured such that the object-side surface of the sixth lens L6 is convex in the vicinity of an optical axis, and the seventh lens L7 is a lens having at least one aspherical surface and configured such that a single inflection point or a plurality of inflection points is provided on the aspherical surface of the seventh lens L7, and wherein the ratio of the center thickness ct1 to the effective-diameter outermost thickness et1 of the first lens L1 satisfies 1.0<ct1/et1<1.8 and the refractive power P1 of the first lens L1 satisfies −0.01<P1<0.01.

Consequently, the positive and negative refractive powers of the respective lenses constituting the lens system are uniformly distributed, whereby it is possible to realize high performance suitable for a high-resolution small lens system.

In particular, the first lens L1 is a meniscus lens having a convex surface facing the object, the ratio of the center thickness ct1 to the effective-diameter outermost thickness et1 of the first lens L1 satisfies $1.0<ct1/et1<1.8$, and the refractive power P1 of the first lens L1 satisfies $-0.01<P1<0.01$.

That is, the first lens L1 is formed as a meniscus lens having a convex surface facing the object, whereby it is advantageous in securing a space for the first lens L1 in a barrel, the center thickness of the first lens L1 is appropriately larger than the effective-diameter outermost thickness of the first lens L1, and the refractive power of the first lens L1 is formed so as to approximate to 0. Consequently, it is possible to miniaturize the first lens L1. In addition, the refractive power of the first lens L1 is very small while the curvature of the first lens L1 is relatively high, whereby the tolerance of the first lens L1 is alleviated even though TTL of the first lens L1 is very short, and therefore a possibility of reproducing the performance of the first lens L1 is increased.

The second lens L2 is a meniscus lens having a convex surface facing the object and a positive refractive power. The second lens L2 is formed so as to be very close to the first lens L1, whereby it is advantageous in realizing a small lens system.

The third lens L3 is a meniscus lens having a positive or negative refractive power, the fourth lens L4 is a meniscus lens having opposite surfaces convex toward the image, the fifth lens L5 is a meniscus lens having opposite surfaces convex toward the image, the sixth lens L6 is a lens having at least one aspherical surface and configured such that the object-side surface of the sixth lens L6 is convex in the vicinity of the optical axis, and the seventh lens L7 is a lens having at least one aspherical surface and configured such that a single inflection point or a plurality of inflection points is provided on the aspherical surface of the seventh lens L7, whereby a small lens system is realized.

Also, in the small lens system according to the present invention, the ratio of the distance TTL between the object-side surface of the first lens L1 and an image surface to the image height ImagH satisfies $1.0<TTL/ImagH<1.5$, whereby it is possible to provide a small lens system having a short length, which is suitable for application to a small electronic device, such as a smartphone having a small thickness.

In addition, the absolute value of the ratio of the composite focal distance f1234 of the first lens L1, the second lens L2, the third lens L3, and the fourth lens L4 to the composite focal distance f567 of the fifth lens L5, the sixth lens L6, and the seventh lens L7 satisfies $0.3<|f1234/f567|<0.8$.

This means that the absolute value of the ratio of the composite focal distance of the first lens L1, the second lens L2, the third lens L3, and the fourth lens L4 to the composite focal distance f567 of the fifth lens L5, the sixth lens L6, and the seventh lens L7 is defined, whereby the lenses have a strong refractive power, and therefore a miniaturized wide-angle lens system is achieved.

In addition, the sixth lens L6 is configured such that opposite surfaces of the sixth lens L6 are convex toward the image in the peripheral portion thereof, and the seventh lens L7 is configured such that the object-side surface of the seventh lens L7 is convex toward the object in the peripheral portion thereof and the image-side surface of the seventh lens L7 is convex toward the image in the peripheral portion thereof.

That is, the sixth lens L6 and the seventh lens L7 are formed so as to be convex toward the image in order to reduce an angle of incidence and thus to improve flare.

In addition, each of the first to seventh lenses L1 to L7 is made of a plastic material, and all surfaces of the lenses are formed as aspherical surfaces, whereby it is possible to correct spherical aberration and chromatic aberration. Furthermore, each of the lenses is made of a material having a refractive index advantageous to reduce the length thereof, and the lenses are made of materials having different Abbe numbers so as to be advantageous in correcting chromatic aberration.

In addition, the absolute value of the ratio of the effective-diameter outermost thickness et6 to the center thickness ct6 of the sixth lens L6 satisfies $0.5<|et6/ct6|<1.2$, whereby the center thickness and the effective-diameter outermost thickness of the sixth lens L6 are similar to each other. As a result, the flow of a resin is smoothly maintained during injection of the resin, whereby manufacturing tolerance is alleviated. Consequently, a possibility of reproducing the performance of the sixth lens L6 is increased, and therefore it is advantageous for application to a small lens system.

In addition, an angle A between the image-side surface of the fourth lens L4 and the optical axis in the vicinity of the optical axis satisfies $85°<A<95°$, and an angle A between the object-side surface of the fifth lens L5 and the optical axis in the vicinity of the optical axis satisfies $85°<A<95°$, in order to reduce flare and to design a small lens system.

In addition, the small lens system according to the present invention is characterized in that the field of view of the small lens system is greater than 70 degrees, and provides a wide-angle image.

Also, in the small lens system according to the present invention, the absolute value of the ratio of the focal distance f1 of the first lens L1 to the focal distance F of the entire lens system satisfies $10000<|f1/F|$. This prescribes the ratio of the focal distance of the first lens L1 to the composite focal distance of the entire lens system. Consequently, it is possible to correct aberration and to miniaturize the lens system. Furthermore, the focal distance of the first lens L1 is increased such that the refractive power of the first lens L1 approximates to 0, whereby the tolerance of the first lens L1 is alleviated.

In addition, the ratio of the effective-diameter outermost distance et12 between the first lens L1 and the second lens L2 to the center distance ct12 between the first lens L1 and the second lens L2 satisfies $3<et12/ct12<7$. That is, the distance between the effective-diameter outermost portion of the first lens L1 and the effective-diameter outermost portion of the second lens L2 is increased so as to be advantageous in improving flare.

In addition, the Abbe number V1 of the first lens L1, the Abbe number V2 of the second lens L2, the Abbe number V3 of the third lens L3, the Abbe number V4 of the fourth lens L4, the Abbe number V5 of the fifth lens L5, the Abbe number V6 of the sixth lens L6, and the Abbe number V7 of the seventh lens L7 satisfy $50<V1<60$, $50<V2<60$, $15<V3<30$, $15<V4<30$, $50<V5<60$, $15<V6<30$, and $50<V7<60$, respectively. That is, the Abbe numbers of the respective lenses are uniformly distributed, whereby power is divided and chromatic aberration is corrected.

Meanwhile, in the lens system according to the present invention, an angle of incidence AOI that an ordinary ray of a field forms with a normal line at a point of the image-side surface of the seventh lens L7 through which the ordinary ray passes satisfies AOI<11°.

That is, the angle of incidence of the ordinary ray of the field is set to less than 11° such that the shape of the outside corner of the image-side surface of the seventh lens L7 is inclined toward the object, which is advantageous to a small lens system.

As described above, the present invention relates to a lens system including a total of seven lenses, more particularly to a lens system configured such that a first lens L1, a second lens L2, a third lens L3, a fourth lens L4, a fifth lens L5, a sixth lens L6, and a seventh lens L7 are sequentially arranged from an object along an optical axis.

In addition, the present invention provides a small wide-angle lens system configured such that the lens system is small and lightweight by appropriately designing the refractive powers, shapes, etc. of the lenses and such that the lens system has a field of view greater than 70 degrees by correcting distortion.

In particular, the present invention provides a small wide-angle lens system configured such that the overall curvature of the lens system is increased in order to reduce power, whereby the tolerance of the lens system is alleviated even though TTL is short.

In addition, the ratio of the distance between the object-side surface of the first lens L1 and an image surface to the height of the image surface is less than 1.5, whereby it is possible to provide a lens system having a short length, which is easily applicable to a thin or small camera module, particularly a smartphone.

Hereinafter, embodiments of the present invention will be described with reference to the accompanying drawings.

First Embodiment

FIG. 2 is a view showing a first embodiment of a small high-resolution wide-angle lens system according to the present invention.

As shown, a first lens L1, a second lens L2, a third lens L3, a fourth lens L4, a fifth lens L5, a sixth lens L6, and a seventh lens L7 are sequentially arranged from an object on the optical axis.

Table 1 below shows numerical data of the lenses constituting the lens system according to the first embodiment of the present invention.

TABLE 1

| Surface (Surface number) | RDY (Radius of curvature) | THI (Thickness) | Nd (Refractive index) | Vd (Abbe number) |
|---|---|---|---|---|
| Object | Infinity | Infinity | | |
| S1 | 2.295 | 0.370 | 1.5441 | 56.0 |
| Stop (S2) | 2.165 | 0.070 | | |
| S3 | 1.943 | 0.681 | 1.5441 | 56.0 |
| S4 | 18.446 | 0.050 | | |
| S5 | 17.895 | 0.230 | 1.6700 | 19.4 |
| S6 | 4.865 | 0.441 | | |
| S7 | 100.000 | 0.383 | 1.6150 | 25.9 |
| S8 | −163.336 | 0.684 | | |
| S9 | 2557.132 | 0.428 | 1.5441 | 56.0 |
| S10 | −5.268 | 0.157 | | |
| S11 | 9.140 | 0.379 | 1.6150 | 25.9 |
| S12 | 26.446 | 0.522 | | |
| S13 | −29.300 | 0.500 | 1.5350 | 560.0 |
| S14 | 2.236 | 0.195 | | |
| S15 | Infinity | 0.110 | 1.5168 | 64.2 |
| S16 | Infinity | 0.790 | | |
| Image | Infinity | 0.000 | | |

As shown in FIG. 2, the first lens L1, the second lens L2, the third lens L3, the fourth lens L4, the fifth lens L5, the sixth lens L6, and the seventh lens L7 are sequentially arranged from the object. On the assumption that an optical-axis direction is X and a direction perpendicular to the optical axis is Y, the following aspherical equation is defined.

[Mathematical Expression 1]

$$X(Y) = \frac{Y^2}{R} \frac{1}{1 + \sqrt{1 - (1+K)\left(\frac{Y}{R}\right)^2}} + A_3 Y^4 + A_4 Y^6 + A_5 Y^8 + A_6 Y^{10} + \ldots + A_{14} Y^{26}$$

An aspherical surface is a curved surface obtained by rotating a curve obtained by the aspherical equation of Mathematical Expression 1 about the optical axis. R indicates the radius of curvature, K indicates a conic constant, and $A_3$, $A_4$, $A_5$, $A_6$, . . . , and $A_{14}$ indicate aspherical coefficients.

The aspherical coefficients having data of the respective lenses obtained from Mathematical Expression 1 above are shown in Table 2 below.

TABLE 2

| | s1 | s2 | s3 | s4 | s5 | s6 | s7 | s8 | s9 | s10 | s11 | s12 | s13 | s14 |
|---|---|---|---|---|---|---|---|---|---|---|---|---|---|---|
| K | −3.44 | −1.33 | −0.22 | −0.01 | 0.02 | 13.94 | 0.00 | 0.00 | −98.94 | 3.47 | 0.00 | 0.00 | 69.15 | −12.49 |
| A3 | 0.00 | −0.12 | −0.08 | −0.10 | −0.12 | −0.05 | −0.10 | −0.08 | 0.01 | 0.05 | 0.04 | 0.05 | −0.11 | −0.04 |
| A4 | −0.03 | −0.02 | −0.03 | 0.31 | 0.37 | 0.16 | 0.09 | 0.01 | 0.00 | −0.04 | −0.08 | −0.07 | 0.05 | 0.01 |
| A5 | 0.06 | 0.07 | 0.12 | −0.83 | −0.81 | −0.28 | −0.40 | 0.00 | −0.02 | 0.03 | 0.04 | 0.03 | −0.02 | 0.00 |
| A6 | −0.11 | −0.06 | −0.19 | 1.70 | 1.53 | 0.45 | 1.18 | −0.01 | 0.02 | −0.01 | 0.00 | 0.00 | 0.01 | 0.00 |
| A7 | 0.11 | 0.06 | 0.27 | 2.29 | −2.04 | −0.58 | −2.14 | 0.02 | −0.01 | 0.00 | 0.00 | 0.00 | 0.00 | 0.00 |
| A8 | −0.07 | −0.04 | −0.25 | 1.90 | 1.72 | 0.48 | 2.40 | −0.02 | 0.00 | 0.00 | 0.00 | 0.00 | 0.00 | 0.00 |
| A9 | 0.03 | 0.02 | 0.14 | −0.94 | −0.85 | −0.22 | −1.63 | 0.01 | 0.00 | 0.00 | 0.00 | 0.00 | 0.00 | 0.00 |
| A10 | −0.01 | −0.01 | −0.04 | 0.25 | 0.23 | 0.05 | 0.61 | 0.00 | 0.00 | 0.00 | 0.00 | 0.00 | 0.00 | 0.00 |
| A11 | 0.00 | 0.00 | 0.00 | −0.03 | −0.03 | 0.00 | −0.10 | 0.00 | 0.00 | 0.00 | 0.00 | 0.00 | 0.00 | 0.00 |

The ratio ct1/et1 of the center thickness ct1 of the first lens L1 to the effective-diameter outermost thickness et1 of the first lens L1 is 1.52, and the ratio TTL/ImagH of the distance TTL between the object-side surface of the first lens L1 and an image surface to the image height ImagH is 1.248.

The effective-diameter outermost distance et12 between the first lens L1 and the second lens L2 is 0.363, and the center distance ct12 between the first lens L1 and the second lens L2 is 0.07. In addition, the effective-diameter outermost thickness et6 of the sixth lens L6 is 0.28, and the center thickness ct6 of the sixth lens L6 satisfies 0.379.

The field of view of the entire lens system is 83.2 degrees, and the absolute value of the ratio of the composite focal distance f1234 of the first lens L1, the second lens L2, the third lens L3, and the fourth lens L4 to the composite focal distance f567 of the fifth lens L5, the sixth lens L6, and the seventh lens L7 is 0.382.

In addition, an angle of incidence AOI that an ordinary ray of a field forms with a normal line at a point of the image-side surface of the seventh lens L7 through which the ordinary ray passes is about 5°.

FIG. 3 is a view showing aberration according to a first embodiment of the present invention.

First data of FIG. 3 show spherical aberration, wherein the horizontal axis indicates focus (mm), the vertical axis indicates image height (mm), and respective graphs indicate the wavelengths of incident rays. It is known that the more the graphs approach the central vertical axis line and approach each other, as shown, the better the efficiency of correcting spherical aberration. The spherical aberration according to the first embodiment of the present invention is 0.025 mm (focus) or less, which is determined to be good.

Second data of FIG. 3 show astigmatism aberration, wherein the horizontal axis indicates focus (mm), the vertical axis indicates image height (mm), graph S indicates sagittal, which is a ray incident in a direction parallel to the lens, and graph T indicates tangential, which is a ray incident in a direction perpendicular to the lens. It is known that the more graphs S and T approach each other and approach the central vertical axis, the better the efficiency of correcting astigmatism aberration. The astigmatism aberration according to the first embodiment of the present invention is 0.025 mm (focus) or less, which is determined to be good.

Third data of FIG. 3 show distortion aberration, wherein the horizontal axis indicates distortion degree (%), and the vertical axis indicates image height (mm). In general, it is known that, in the case in which an aberration curve is within a range of −2 to 2%, distortion aberration is good. Optical distortion, as the distortion aberration according to the first embodiment of the present invention, is 2% or less, which is determined to be good.

Second Embodiment

FIG. 4 is a view showing a second embodiment of the high-resolution wide-angle lens system according to the present invention.

As shown, a first lens L1, a second lens L2, a third lens L3, a fourth lens L4, a fifth lens L5, a sixth lens L6, and a seventh lens L7 are sequentially arranged from an object on the optical axis.

Table 3 below shows numerical data of the lenses constituting the optical system according to the second embodiment of the present invention.

TABLE 3

| Surface (Surface number) | RDY (Radius of curvature) | THI (Thickness) | Nd (Refractive index) | Vd (Abbe number) |
|---|---|---|---|---|
| Object | Infinity | Infinity | | |
| S1 | 2.301 | 0.361 | 1.5441 | 56.0 |
| Stop | 2.174 | 0.070 | | |
| S3 | 1.951 | 0.689 | 1.5441 | 56.0 |
| S4 | 20.186 | 0.050 | | |
| S5 | 19.225 | 0.230 | 1.6700 | 19.4 |
| S6 | 4.912 | 0.452 | | |
| S7 | 100.000 | 0.373 | 1.6150 | 25.9 |
| S8 | −174.607 | 0.696 | | |
| S9 | −104.962 | 0.432 | 1.5441 | 56.0 |
| S10 | −5.052 | 0.097 | | |
| 11 | 9.372 | 0.371 | 1.6150 | 25.9 |
| 12 | 29.123 | 0.577 | | |
| 13 | −29.172 | 0.500 | 1.5350 | 560.0 |
| 14 | 2.242 | 0.191 | | |
| 15 | Infinity | 0.110 | 1.5168 | 64.2 |
| 16 | Infinity | 0.790 | | |
| Image | Infinity | 0.000 | | |

As shown in FIG. 4, the first lens L1, the second lens L2, the third lens L3, the fourth lens L4, the fifth lens L5, the sixth lens L6, and the seventh lens L7 are sequentially arranged from the object. On the assumption that an optical-axis direction is X and a direction perpendicular to the optical axis is Y, an aspherical equation is defined by Mathematical Expression 1 above.

An aspherical surface is a curved surface obtained by rotating a curve obtained by the aspherical equation of Mathematical Expression 1 about the optical axis. R indicates the radius of curvature, K indicates a conic constant, and $A_3$, $A_4$, $A_5$, $A_6$, . . . , and $A_{14}$ indicate aspherical coefficients.

The aspherical coefficients having data of the respective lenses obtained from Mathematical Expression 1 above are shown in Table 4 below.

TABLE 4

| | s1 | s2 | s3 | s4 | s5 | s6 | s7 | s8 | s9 | s10 | s11 | s12 | s13 | s14 |
|---|---|---|---|---|---|---|---|---|---|---|---|---|---|---|
| K | −3.60 | −1.33 | −0.19 | −0.01 | 0.02 | 14.35 | 0.00 | 0.00 | −98.94 | 3.47 | 0.00 | 0.00 | 69.15 | −12.49 |
| A3 | 0.00 | −0.13 | −0.08 | −0.11 | −0.12 | −0.05 | −0.10 | −0.09 | −0.01 | 0.03 | 0.05 | 0.07 | −0.10 | −0.04 |
| A4 | −0.03 | −0.01 | −0.02 | 0.31 | 0.36 | 0.16 | 0.10 | 0.02 | 0.03 | −0.01 | −0.08 | −0.08 | 0.04 | 0.01 |
| A5 | 0.06 | 0.06 | 0.11 | −0.76 | −0.73 | −0.28 | −0.39 | −0.02 | −0.06 | −0.01 | 0.04 | 0.03 | −0.02 | 0.00 |
| A6 | −0.11 | −0.06 | −0.17 | 1.53 | 1.31 | 0.45 | 1.06 | 0.01 | 0.05 | 0.01 | 0.00 | −0.01 | 0.01 | 0.00 |
| A7 | 0.12 | 0.04 | 0.23 | −2.04 | −1.71 | −0.57 | −1.85 | 0.00 | −0.03 | −0.01 | 0.00 | 0.00 | 0.00 | 0.00 |
| A8 | −0.07 | −0.03 | −0.21 | 1.68 | 1.42 | 0.47 | 2.02 | −0.01 | 0.01 | 0.00 | 0.00 | 0.00 | 0.00 | 0.00 |
| A9 | 0.03 | 0.02 | 0.12 | −0.82 | −0.69 | −0.22 | −1.34 | 0.01 | 0.00 | 0.00 | 0.00 | 0.00 | 0.00 | 0.00 |
| A10 | −0.01 | 0.00 | −0.03 | 0.22 | 0.18 | 0.05 | 0.49 | 0.00 | 0.00 | 0.00 | 0.00 | 0.00 | 0.00 | 0.00 |
| A11 | 0.00 | 0.00 | 0.00 | −0.02 | −0.02 | 0.00 | −0.08 | 0.00 | 0.00 | 0.00 | 0.00 | 0.00 | 0.00 | 0.00 |

The ratio ct1/et1 of the center thickness ct1 of the first lens L1 to the effective-diameter outermost thickness et1 of the first lens L1 is 1.504, and the ratio TTL/ImagH of the distance TTL between the object-side surface of the first lens L1 and an image surface to the image height ImagH is 1.248.

The effective-diameter outermost distance et12 between the first lens L1 and the second lens L2 is 0.368, and the center distance ct12 between the first lens L1 and the second lens L2 is 0.07. In addition, the effective-diameter outermost thickness et6 of the sixth lens L6 is 0.28, and the center thickness ct6 of the sixth lens L6 satisfies 0.371.

The field of view of the entire lens system is 83.4 degrees, and the absolute value of the ratio of the composite focal distance f1234 of the first lens L1, the second lens L2, the third lens L3, and the fourth lens L4 to the composite focal distance f567 of the fifth lens L5, the sixth lens L6, and the seventh lens L7 is 0.381.

In addition, an angle of incidence AOI that an ordinary ray of a field forms with a normal line at a point of the image-side surface of the seventh lens L7 through which the ordinary ray passes is about 3°.

FIG. 5 is a view showing aberration according to a second embodiment of the present invention.

First data of FIG. 5 show spherical aberration, wherein the horizontal axis indicates focus (mm), the vertical axis indicates image height (mm), and respective graphs indicate the wavelengths of incident rays. It is known that the more the graphs approach the central vertical axis line and approach each other, as shown, the better the efficiency of correcting spherical aberration. The spherical aberration according to the second embodiment of the present invention is 0.025 mm (focus) or less, which is determined to be good.

Second data of FIG. 5 show astigmatism aberration, wherein the horizontal axis indicates focus (mm), the vertical axis indicates image height (mm), graph S indicates sagittal, which is a ray incident in a direction parallel to the lens, and graph T indicates tangential, which is a ray incident in a direction perpendicular to the lens. It is known that the more graphs S and T approach each other and approach the central vertical axis, the better the efficiency of correcting astigmatism aberration. The astigmatism aberration according to the second embodiment of the present invention is 0.025 mm (focus) or less, which is determined to be good.

Third data of FIG. 5 show distortion aberration, wherein the horizontal axis indicates distortion degree (%), and the vertical axis indicates image height (mm). In general, it is known that, in the case in which an aberration curve is within a range of −2 to 2%, distortion aberration is good. Optical distortion, as the distortion aberration according to the second embodiment of the present invention, is 2% or less, which is determined to be good.

Third Embodiment

FIG. 6 is a view showing a third embodiment of the high-resolution wide-angle lens system according to the present invention.

As shown, a first lens L1, a second lens L2, a third lens L3, a fourth lens L4, a fifth lens L5, a sixth lens L6, and a seventh lens L7 are sequentially arranged from an object on the optical axis.

Table 5 below shows numerical data of the lenses constituting the optical system according to the third embodiment of the present invention.

TABLE 5

| Surface (Surface number) | RDY (Radius of curvature) | THI (Thickness) | Nd (Refractive index) | Vd (Abbe number) |
|---|---|---|---|---|
| Object | Infinity | Infinity | | |
| S1 | 2.294 | 0.361 | 1.5441 | 56.0 |
| Stop(S2) | 2.167 | 0.070 | | |
| S3 | 1.948 | 0.687 | 1.5441 | 56.0 |
| S4 | 19.181 | 0.042 | | |
| S5 | 18.284 | 0.228 | 1.6700 | 19.4 |
| S6 | 4.908 | 0.465 | | |
| S7 | 100.000 | 0.371 | 1.6150 | 25.9 |
| S8 | −241.418 | 0.701 | | |
| S9 | −108.345 | 0.431 | 1.5441 | 56.0 |
| S10 | −5.059 | 0.086 | | |
| S11 | 9.005 | 0.370 | 1.6150 | 25.9 |
| S12 | 25.677 | 0.586 | | |
| S13 | −29.266 | 0.500 | 1.5350 | 560.0 |
| S14 | 2.258 | 0.192 | | |
| S15 | Infinity | 0.110 | 1.5168 | 64.2 |
| S16 | Infinity | 0.790 | | |
| Image | Infinity | 0.000 | | |

As shown in FIG. 6, the first lens L1, the second lens L2, the third lens L3, the fourth lens L4, the fifth lens L5, the sixth lens L6, and the seventh lens L7 are sequentially arranged from the object. On the assumption that an optical-axis direction is X and a direction perpendicular to the optical axis is Y, an aspherical equation is defined by Mathematical Expression 1 above.

An aspherical surface is a curved surface obtained by rotating a curve obtained by the aspherical equation of Mathematical Expression 1 about the optical axis. R indicates the radius of curvature, K indicates a conic constant, and $A_3$, $A_4$, $A_5$, $A_6$, . . . , and $A_{14}$ indicate aspherical coefficients.

The aspherical coefficients having data of the respective lenses obtained from Mathematical Expression 1 above are shown in Table 6 below.

TABLE 6

| | s1 | s2 | s3 | s4 | s5 | s6 | s7 | s8 | s9 | s10 | s11 | s12 | s13 | s14 |
|---|---|---|---|---|---|---|---|---|---|---|---|---|---|---|
| K | −3.57 | 1.33 | −0.19 | −0.01 | 0.02 | 14.37 | 0.00 | 0.00 | −98.94 | 3.47 | 0.00 | 0.00 | 69.15 | −12.49 |
| A3 | 0.00 | −0.12 | −0.08 | −0.11 | −0.12 | −0.04 | −0.10 | −0.09 | −0.01 | 0.03 | 0.06 | 0.08 | −0.09 | −0.04 |
| A4 | −0.03 | −0.01 | −0.02 | 0.32 | 0.35 | 0.14 | 0.09 | 0.02 | 0.04 | −0.02 | −0.10 | −0.09 | 0.04 | 0.01 |
| A5 | 0.06 | 0.06 | 0.12 | −0.80 | −0.74 | −0.26 | −0.37 | −0.02 | −0.07 | 0.00 | 0.05 | 0.04 | −0.02 | 0.00 |
| A6 | −0.11 | −0.04 | −0.17 | 1.65 | 1.39 | 0.42 | 0.99 | 0.02 | 0.06 | 0.00 | −0.01 | −0.01 | 0.00 | 0.00 |
| A7 | 0.11 | 0.03 | 0.23 | −2.24 | −1.88 | −0.55 | −1.71 | 0.00 | −0.03 | −0.01 | 0.00 | 0.00 | 0.00 | 0.00 |
| A8 | −0.07 | −0.02 | −0.21 | 1.89 | 1.61 | 0.46 | 1.86 | −0.01 | 0.01 | 0.00 | 0.00 | 0.00 | 0.00 | 0.00 |
| A9 | 0.03 | 0.01 | 0.12 | −0.94 | −0.81 | −0.22 | −1.23 | 0.01 | 0.00 | 0.00 | 0.00 | 0.00 | 0.00 | 0.00 |
| A10 | −0.01 | 0.00 | −0.03 | 0.25 | 0.22 | 0.05 | 0.45 | 0.00 | 0.00 | 0.00 | 0.00 | 0.00 | 0.00 | 0.00 |
| A11 | 0.00 | 0.00 | 0.00 | −0.03 | −0.02 | 0.00 | −0.07 | 0.00 | 0.00 | 0.00 | 0.00 | 0.00 | 0.00 | 0.00 |

The ratio ct1/et1 of the center thickness ct1 of the first lens L1 to the effective-diameter outermost thickness et1 of the first lens L1 is 1.505, and the ratio TTL/ImagH of the distance TTL between the object-side surface of the first lens L1 and an image surface to the image height ImagH is 1.248.

The effective-diameter outermost distance et12 between the first lens L1 and the second lens L2 is 0.367, and the center distance ct12 between the first lens L1 and the second lens L2 is 0.07. In addition, the effective-diameter outermost thickness et6 of the sixth lens L6 is 0.28, and the center thickness ct6 of the sixth lens L6 satisfies 0.370.

The field of view of the entire lens system is 83.4 degrees, and the absolute value of the ratio of the composite focal distance f1234 of the first lens L1, the second lens L2, the third lens L3, and the fourth lens L4 to the composite focal distance f567 of the fifth lens L5, the sixth lens L6, and the seventh lens L7 is 0.372.

In addition, an angle of incidence AOI that an ordinary ray of a field forms with a normal line at a point of the image-side surface of the seventh lens L7 through which the ordinary ray passes is about 3°.

FIG. 7 is a view showing aberration according to a third embodiment of the present invention.

First data of FIG. 7 show spherical aberration, wherein the horizontal axis indicates focus (mm), the vertical axis indicates image height (mm), and respective graphs indicate the wavelengths of incident rays. It is known that the more the graphs approach the central vertical axis line and approach each other, as shown, the better the efficiency of correcting spherical aberration. The spherical aberration according to the third embodiment of the present invention is 0.025 mm (focus) or less, which is determined to be good.

Second data of FIG. 7 show astigmatism aberration, wherein the horizontal axis indicates focus (mm), the vertical axis indicates image height (mm), graph S indicates sagittal, which is a ray incident in a direction parallel to the lens, and graph T indicates tangential, which is a ray incident in a direction perpendicular to the lens. It is known that the more graphs S and T approach each other and approach the central vertical axis, the better the efficiency of correcting astigmatism aberration. The astigmatism aberration according to the third embodiment of the present invention is 0.025 mm (focus) or less, which is determined to be good.

Third data of FIG. 7 show distortion aberration, wherein the horizontal axis indicates distortion degree (%), and the vertical axis indicates image height (mm). In general, it is known that, in the case in which an aberration curve is within a range of -2 to 2%, distortion aberration is good. Optical distortion, as the distortion aberration according to the third embodiment of the present invention, is 2% or less, which is determined to be good.

Fourth Embodiment

FIG. 8 is a view showing a fourth embodiment of the high-resolution wide-angle lens system according to the present invention.

As shown, a first lens L1, a second lens L2, a third lens L3, a fourth lens L4, a fifth lens L5, a sixth lens L6, and a seventh lens L7 are sequentially arranged from an object on the optical axis.

Table 7 below shows numerical data of the lenses constituting the optical system according to the fourth embodiment of the present invention.

TABLE 7

| Surface (Surface number) | RDY (Radius of curvature) | THI (Thickness) | Nd (Refractive index) | Vd (Abbe number) |
|---|---|---|---|---|
| Object | Infinity | Infinity | | |
| S1 | 2.295 | 0.361 | 1.5441 | 56.0 |
| Stop(S2) | 2.167 | 0.070 | | |
| S3 | 1.948 | 0.686 | 1.5441 | 56.0 |
| S4 | 19.380 | 0.041 | | |
| S5 | 18.470 | 0.228 | 1.6700 | 19.4 |
| S6 | 4.909 | 0.466 | | |
| S7 | 96.388 | 0.373 | 1.6150 | 25.9 |
| S8 | -263.646 | 0.700 | | |
| S9 | -107.874 | 0.431 | 1.5441 | 56.0 |
| S10 | -5.062 | 0.081 | | |
| S11 | 8.951 | 0.375 | 1.6150 | 25.9 |
| S12 | 25.475 | 0.587 | | |
| S13 | -29.252 | 0.500 | 1.5350 | 560.0 |
| S14 | 2.269 | 0.192 | | |
| S15 | Infinity | 0.110 | 1.5168 | 64.2 |
| S16 | Infinity | 0.790 | | |
| Image | Infinity | 0.000 | | |

As shown in FIG. 8, the first lens L1, the second lens L2, the third lens L3, the fourth lens L4, the fifth lens L5, the sixth lens L6, and the seventh lens L7 are sequentially arranged from the object. On the assumption that an optical-axis direction is X and a direction perpendicular to the optical axis is Y, an aspherical equation is defined by Mathematical Expression 1 above.

An aspherical surface is a curved surface obtained by rotating a curve obtained by the aspherical equation of Mathematical Expression 1 about the optical axis. R indicates the radius of curvature, K indicates a conic constant, and $A_3$, $A_4$, $A_5$, $A_6$, . . . , and $A_{14}$ indicate aspherical coefficients.

The aspherical coefficients having data of the respective lenses obtained from Mathematical Expression 1 above are shown in Table 8 below.

TABLE 8

| | s1 | s2 | s3 | s4 | s5 | s6 | s7 | s8 | s9 | s10 | s11 | s12 | s13 | s14 |
|---|---|---|---|---|---|---|---|---|---|---|---|---|---|---|
| K | -3.57 | -1.33 | -0.19 | -0.01 | 0.02 | 14.37 | 0.00 | 0.00 | -98.94 | 3.47 | 0.00 | 0.00 | 69.15 | -12.49 |
| A3 | 0.00 | -0.12 | -0.08 | -0.11 | -0.12 | -0.04 | -0.10 | -0.09 | -0.01 | 0.03 | 0.06 | 0.08 | -0.09 | -0.04 |
| A4 | -0.03 | -0.01 | -0.03 | 0.32 | 0.35 | 0.14 | 0.09 | 0.02 | 0.04 | -0.02 | -0.10 | -0.09 | 0.04 | 0.01 |
| A5 | 0.06 | 0.06 | 0.12 | -0.80 | -0.74 | -0.25 | -0.36 | -0.02 | -0.07 | 0.00 | 0.05 | 0.04 | -0.01 | 0.00 |
| A6 | -0.11 | -0.04 | -0.18 | 1.64 | 1.40 | 0.42 | 0.98 | 0.02 | 0.06 | 0.00 | -0.01 | -0.01 | 0.00 | 0.00 |
| A7 | 0.11 | 0.03 | 0.24 | -2.25 | -1.90 | -0.55 | -1.70 | 0.00 | -0.03 | -0.01 | 0.00 | 0.00 | 0.00 | 0.00 |
| A8 | -0.07 | -0.02 | -0.22 | 1.89 | 1.62 | 0.46 | 1.84 | -0.01 | 0.01 | 0.00 | 0.00 | 0.00 | 0.00 | 0.00 |
| A9 | 0.03 | 0.01 | 0.12 | -0.94 | -0.82 | -0.22 | -1.22 | 0.01 | 0.00 | 0.00 | 0.00 | 0.00 | 0.00 | 0.00 |
| A10 | -0.01 | 0.00 | -0.03 | 0.25 | 0.22 | 0.05 | 0.45 | 0.00 | 0.00 | 0.00 | 0.00 | 0.00 | 0.00 | 0.00 |
| A11 | 0.00 | 0.00 | 0.00 | -0.03 | -0.02 | 0.00 | -0.07 | 0.00 | 0.00 | 0.00 | 0.00 | 0.00 | 0.00 | 0.00 |

The ratio ct1/et1 of the center thickness ct1 of the first lens L1 to the effective-diameter outermost thickness et1 of the first lens L1 is 1.504, and the ratio TTL/ImagH of the distance TTL between the object-side surface of the first lens L1 and an image surface to the image height Images is 1.248.

The effective-diameter outermost distance et12 between the first lens L1 and the second lens L2 is 0.366, and the center distance ct12 between the first lens L1 and the second lens L2 is 0.07. In addition, the effective-diameter outermost thickness et6 of the sixth lens L6 is 0.28, and the center thickness ct6 of the sixth lens L6 satisfies 0.375.

The field of view of the entire lens system is 83.6 degrees, and the absolute value of the ratio of the composite focal distance f1234 of the first lens L1, the second lens L2, the third lens L3, and the fourth lens L4 to the composite focal distance f567 of the fifth lens L5, the sixth lens L6, and the seventh lens L7 is 0.365.

In addition, an angle of incidence AOI that an ordinary ray of a field forms with a normal line at a point of the image-side surface of the seventh lens L7 through which the ordinary ray passes is about 2°.

FIG. 9 is a view showing aberration according to a fourth embodiment of the present invention.

First data of FIG. 9 show spherical aberration, wherein the horizontal axis indicates focus (mm), the vertical axis indicates image height (mm), and respective graphs indicate the wavelengths of incident rays. It is known that the more the graphs approach the central vertical axis line and approach each other, as shown, the better the efficiency of correcting spherical aberration. The spherical aberration according to the fourth embodiment of the present invention is 0.025 mm (focus) or less, which is determined to be good.

Second data of FIG. 9 show astigmatism aberration, wherein the horizontal axis indicates focus (mm), the vertical axis indicates image height (mm), graph S indicates sagittal, which is a ray incident in a direction parallel to the lens, and graph T indicates tangential, which is a ray incident in a direction perpendicular to the lens. It is known that the more graphs S and T approach each other and approach the central vertical axis, the better the efficiency of correcting astigmatism aberration. The astigmatism aberration according to the fourth embodiment of the present invention is 0.025 mm (focus) or less, which is determined to be good.

Third data of FIG. 9 show distortion aberration, wherein the horizontal axis indicates distortion degree (%), and the vertical axis indicates image height (mm). In general, it is known that, in the case in which an aberration curve is within a range of −2 to 2%, distortion aberration is good. Optical distortion, as the distortion aberration according to the fourth embodiment of the present invention, is 2% or less, which is determined to be good.

Fifth Embodiment

FIG. 10 is a view showing a fifth embodiment of the high-resolution wide-angle lens system according to the present invention.

As shown, a first lens L1, a second lens L2, a third lens L3, a fourth lens L4, a fifth lens L5, a sixth lens L6, and a seventh lens L7 are sequentially arranged from an object on the optical axis.

Table 9 below shows numerical data of the lenses constituting the optical system according to the fifth embodiment of the present invention.

TABLE 9

| Surface (Surface number) | RDY (Radius of curvature) | THI (Thickness) | Nd (Refractive index) | Vd (Abbe number) |
|---|---|---|---|---|
| Object | Infinity | Infinity | | |
| S1 | 2.291 | 0.360 | 1.5441 | 56.0 |
| Stop(S2) | 2.164 | 0.070 | | |
| S3 | 1.950 | 0.704 | 1.5441 | 56.0 |
| S4 | 41.630 | 0.032 | | |
| S5 | 39.201 | 0.220 | 1.6700 | 19.4 |
| S6 | 4.867 | 0.482 | | |
| S7 | 24.769 | 0.366 | 1.6150 | 25.9 |
| S8 | 38.903 | 0.702 | | |
| S9 | −106.020 | 0.432 | 1.5441 | 56.0 |
| S10 | −5.058 | 0.053 | | |
| S11 | 8.553 | 0.376 | 1.6150 | 25.9 |
| S12 | 22.633 | 0.605 | | |
| S13 | −28.891 | 0.500 | 1.5350 | 560.0 |
| S14 | 2.298 | 0.188 | | |
| S15 | Infinity | 0.110 | 1.5168 | 64.2 |
| S16 | Infinity | 0.790 | | |
| Image | Infinity | 0.000 | | |

As shown in FIG. 10, the first lens L1, the second lens L2, the third lens L3, the fourth lens L4, the fifth lens L5, the sixth lens L6, and the seventh lens L7 are sequentially arranged from the object. On the assumption that an optical-axis direction is X and a direction perpendicular to the optical axis is Y, an aspherical equation is defined by Mathematical Expression 1 above.

An aspherical surface is a curved surface obtained by rotating a curve obtained by the aspherical equation of Mathematical Expression 1 about the optical axis. R indicates the radius of curvature, K indicates a conic constant, and $A_3$, $A_4$, $A_5$, $A_6$, . . . , and $A_{14}$ indicate aspherical coefficients.

The aspherical coefficients having data of the respective lenses obtained from Mathematical Expression 1 above are shown in Table 10 below.

TABLE 10

| | s1 | s2 | s3 | s4 | s5 | s6 | s7 | s8 | s9 | s10 | s11 | s12 | s13 | s14 |
|---|---|---|---|---|---|---|---|---|---|---|---|---|---|---|
| K | −3.56 | −1.32 | −0.19 | −0.01 | 0.02 | 14.26 | 0.00 | 0.00 | −98.94 | 3.47 | 0.00 | 0.00 | 67.75 | −10.22 |
| A3 | 0.00 | −0.12 | −0.07 | −0.11 | −0.12 | −0.04 | −0.10 | −0.09 | −0.02 | 0.02 | 0.06 | 0.08 | −0.08 | −0.04 |
| A4 | −0.03 | −0.02 | −0.04 | 0.33 | 0.36 | 0.12 | 0.03 | 0.02 | 0.06 | 0.01 | −0.10 | −0.10 | 0.02 | 0.01 |
| A5 | 0.05 | 0.05 | 0.12 | −0.83 | −0.73 | −0.16 | −0.05 | −0.02 | −0.09 | −0.03 | 0.05 | 0.05 | 0.00 | 0.00 |
| A6 | −0.09 | 0.00 | −0.16 | 1.77 | 1.42 | 0.23 | 0.07 | 0.01 | 0.08 | 0.02 | −0.01 | −0.01 | 0.00 | 0.00 |
| A7 | 0.10 | −0.03 | 0.23 | −2.52 | −2.01 | −0.31 | −0.07 | 0.01 | −0.04 | −0.01 | 0.00 | 0.00 | 0.00 | 0.00 |
| A8 | −0.07 | 0.01 | −0.24 | 2.18 | 1.78 | 0.28 | 0.05 | −0.02 | 0.01 | 0.00 | 0.00 | 0.00 | 0.00 | 0.00 |
| A9 | 0.02 | 0.00 | 0.14 | −1.11 | −0.92 | −0.14 | −0.03 | 0.01 | 0.00 | 0.00 | 0.00 | 0.00 | 0.00 | 0.00 |
| A10 | −0.01 | 0.00 | −0.04 | 0.31 | 0.25 | 0.03 | 0.01 | 0.00 | 0.00 | 0.00 | 0.00 | 0.00 | 0.00 | 0.00 |
| A11 | 0.00 | 0.00 | 0.01 | −0.03 | −0.03 | 0.00 | 0.00 | 0.00 | 0.00 | 0.00 | 0.00 | 0.00 | 0.00 | 0.00 |

The ratio ct1/et1 of the center thickness ct1 of the first lens L1 to the effective-diameter outermost thickness et1 of the first lens L1 is 1.502, and the ratio TTL/ImagH of the distance TTL between the object-side surface of the first lens L1 and an image surface to the image height ImagH is 1.248.

The effective-diameter outermost distance et12 between the first lens L1 and the second lens L2 is 0.361, and the center distance ct12 between the first lens L1 and the second lens L2 is 0.07. In addition, the effective-diameter outermost thickness et6 of the sixth lens L6 is 0.271, and the center thickness ct6 of the sixth lens L6 satisfies 0.376.

The field of view of the entire lens system is 83.8 degrees, and the absolute value of the ratio of the composite focal distance f1234 of the first lens L1, the second lens L2, the third lens L3, and the fourth lens L4 to the composite focal distance f567 of the fifth lens L5, the sixth lens L6, and the seventh lens L7 is 0.35.

In addition, an angle of incidence AOI that an ordinary ray of a field forms with a normal line at a point of the image-side surface of the seventh lens L7 through which the ordinary ray passes is about 3°.

FIG. 10 is a view showing aberration according to a fifth embodiment of the present invention.

First data of FIG. 10 show spherical aberration, wherein the horizontal axis indicates focus (mm), the vertical axis indicates image height (mm), and respective graphs indicate the wavelengths of incident rays. It is known that the more the graphs approach the central vertical axis line and approach each other, as shown, the better the efficiency of correcting spherical aberration. The spherical aberration according to the fifth embodiment of the present invention is 0.025 mm (focus) or less, which is determined to be good.

Second data of FIG. 10 show astigmatism aberration, wherein the horizontal axis indicates focus (mm), the vertical axis indicates image height (mm), graph S indicates sagittal, which is a ray incident in a direction parallel to the lens, and graph T indicates tangential, which is a ray incident in a direction perpendicular to the lens. It is known that the more graphs S and T approach each other and approach the central vertical axis, the better the efficiency of correcting astigmatism aberration. The astigmatism aberration according to the fifth embodiment of the present invention is 0.025 mm (focus) or less, which is determined to be good.

Third data of FIG. 10 show distortion aberration, wherein the horizontal axis indicates distortion degree (%), and the vertical axis indicates image height (mm). In general, it is known that, in the case in which an aberration curve is within a range of −2 to 2%, distortion aberration is good. Optical distortion, as the distortion aberration according to the fifth embodiment of the present invention, is 2% or less, which is determined to be good.

As is apparent from the above description, the present invention relates to a lens system including a first lens, a second lens, a third lens, a fourth lens, a fifth lens, a sixth lens, and a seventh lens arranged from an object along an optical axis, particularly to a small wide-angle lens system configured such that the lens system is small and lightweight by appropriately designing the refractive powers, shapes, etc. of the lenses and such that the lens system has a field of view greater than 70 degrees by correcting distortion.

In particular, the present invention provides a small wide-angle lens system configured such that the overall curvature of the lens system is increased in order to reduce power, whereby the tolerance of the lens system is alleviated even though TTL is short.

In particular, the ratio of the distance between the object-side surface of the first lens and an image surface to the height of the image surface is less than 1.5, whereby it is possible to provide a lens system having a short length, which is easily applicable to a thin or small camera module, particularly a smartphone.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A small lens system comprising a first lens, a second lens, a third lens, a fourth lens, a fifth lens, a sixth lens, and a seventh lens sequentially arranged from an object, wherein
the first lens is a meniscus lens having a convex surface facing the object,
the second lens is a meniscus lens having a convex surface facing the object and a positive refractive power,
the third lens is a meniscus lens having a positive or negative refractive power,
the fourth lens is a meniscus lens having opposite surfaces convex toward an image,
the fifth lens is a meniscus lens having opposite surfaces convex toward the image,
the sixth lens is a lens having at least one aspherical surface and configured such that an object-side surface of the sixth lens is convex in a vicinity of an optical axis, and
the seventh lens is a lens having at least one aspherical surface and configured such that a single inflection point or a plurality of inflection points is provided on the aspherical surface of the seventh lens, and wherein
a ratio of a center thickness (ct1) to an effective-diameter outermost thickness (et1) of the first lens satisfies $1.0 < ct1/et1 < 1.8$, and
a refractive power (P1) of the first lens satisfies $-0.01 < P1 < 0.01$; wherein the small lens system further comprises the following feature (a) or (b):
(a) a ratio of an effective-diameter outermost distance (et12) between the first lens and the second lens to a center distance (c12) between the first lens and the second lens satisfies $3 < et12/ct12 < 7$; or
(b) an Abbe number (V1) of the first lens, an Abbe number (V2) of the second lens, an Abbe number (V3) of the third lens, an Abbe number (V4) of the fourth lens, an Abbe number (V5) of the fifth lens, an Abbe number (V6) of the sixth lens, and an Abbe number (V7) of the seventh lens satisfy $50 < V1 < 60$, $50 < V2 < 60$, $15 < V3 < 30$, $15 < V4 < 30$, $50 < V5 < 60$, $15 < V6 < 30$, and $50 < V7 < 60$, respectively.

2. The small lens system according to claim 1, wherein a ratio of a distance (TTL) between an object-side surface of the first lens and an image surface to an image height (Images) of the small lens system satisfies $1.0 < TTL/ImagH < 1.5$.

3. The small lens system according to claim 1, wherein an absolute value of a ratio of a composite focal distance (f1234) of the first lens, the second lens, the third lens, and the fourth lens to a composite focal distance (f567) of the fifth lens, the sixth lens, and the seventh lens satisfies $0.3 < |f1234/f567| < 0.8$.

4. The small lens system according to claim 1, wherein the sixth lens is configured such that opposite surfaces of the sixth lens are convex toward the image in a peripheral portion thereof.

5. The small lens system according to claim 1, wherein the seventh lens is configured such that an object-side surface of the seventh lens is convex toward the object in a peripheral portion thereof and an image-side surface of the seventh lens is convex toward the image in a peripheral portion thereof.

6. The small lens system according to claim 1, wherein each of the first to seventh lenses is made of a plastic material, and all surfaces of the lenses are aspherical surfaces.

7. The small lens system according to claim 1, wherein an absolute value of a ratio of an effective-diameter outermost thickness (et6) to a center thickness (ct6) of the sixth lens satisfies 0.5<|et6/ct6|<1.2.

8. The small lens system according to claim 1, wherein an angle (A) between an image-side surface of the fourth lens and the optical axis in the vicinity of the optical axis satisfies 85°<A<95°.

9. The small lens system according to claim 1, wherein an angle (A) between an object-side surface of the fifth lens and the optical axis in the vicinity of the optical axis satisfies 85°<A<95°.

10. The small lens system according to claim 1, wherein the small lens system has a field of view greater than 70 degrees.

11. The small lens system according to claim 1, wherein an absolute value of a ratio of a focal distance (f1) of the first lens to a focal distance (F) of the entire lens system satisfies 10000<|f1/F|.

12. The small lens system according to claim 1, wherein a ratio of an effective-diameter outermost distance (et12) between the first lens and the second lens to a center distance (c12) between the first lens and the second lens satisfies 3<et12/ct12<7.

13. The small lens system according to claim 1, wherein an Abbe number (V1) of the first lens, an Abbe number (V2) of the second lens, an Abbe number (V3) of the third lens, an Abbe number (V4) of the fourth lens, an Abbe number (V5) of the fifth lens, an Abbe number (V6) of the sixth lens, and an Abbe number (V7) of the seventh lens satisfy 50<V1<60, 50<V2<60, 15<V3<30, 15<V4<30, 50<V5<60, 15<V6<30, and 50<V7<60, respectively.

14. A small lens system comprising a first lens, a second lens, a third lens, a fourth lens, a fifth lens, a sixth lens, and a seventh lens sequentially arranged from an object, wherein
the first lens is a meniscus lens having a convex surface facing the object,
the second lens is a meniscus lens having a convex surface facing the object and a positive refractive power,
the third lens is a meniscus lens having a positive or negative refractive power,
the fourth lens is a meniscus lens having opposite surfaces convex toward an image,
the fifth lens is a meniscus lens having opposite surfaces convex toward the image,
the sixth lens is a lens having at least one aspherical surface and configured such that an object-side surface of the sixth lens is convex in a vicinity of an optical axis, and
the seventh lens is a lens having at least one aspherical surface and configured such that a single inflection point or a plurality of inflection points is provided on the aspherical surface of the seventh lens, and wherein
a ratio of a center thickness (ct1) to an effective-diameter outermost thickness (et1) of the first lens satisfies 1.0<ct1/et1<1.8,
a refractive power (P1) of the first lens satisfies −0.01<P1<0.01, and
an angle of incidence (AOI) that an ordinary ray of a field forms with a normal line at a point of an image-side surface of the seventh lens through which the ordinary ray passes satisfies AOI<11°; wherein the small lens system further comprises the following feature (a) or (b):
(a) a ratio of an effective-diameter outermost distance (et12) between the first lens and the second lens to a center distance (c12) between the first lens and the second lens satisfies 3<et12/ct12<7; or
(b) an Abbe number (V1) of the first lens, an Abbe number (V2) of the second lens, an Abbe number (V3) of the third lens, an Abbe number (V4) of the fourth lens, an Abbe number (V5) of the fifth lens, an Abbe number (V6) of the sixth lens, and an Abbe number (V7) of the seventh lens satisfy 50<V1<60, 50<V2<60, 15<V3<30, 15<V4<30, 50<V5<60, 15<V6<30, and 50<V7<60, respectively.

15. The small lens system according to claim 14, wherein a ratio of a distance (TTL) between an object-side surface of the first lens and an image surface to an image height (ImagH) of the small lens system satisfies 1.0<TTL/ImagH<1.5.

16. The small lens system according to claim 14, wherein an absolute value of a ratio of a composite focal distance (f1234) of the first lens, the second lens, the third lens, and the fourth lens to a composite focal distance (f567) of the fifth lens, the sixth lens, and the seventh lens satisfies 0.3<|f1234/f567|<0.8.

17. The small lens system according to claim 14, wherein the sixth lens is configured such that opposite surfaces of the sixth lens are convex toward the image in a peripheral portion thereof.

18. The small lens system according to claim 14, wherein the seventh lens is configured such that an object-side surface of the seventh lens is convex toward the object in a peripheral portion thereof and an image-side surface of the seventh lens is convex toward the image in a peripheral portion thereof.

19. The small lens system according to claim 14, wherein each of the first to seventh lenses is made of a plastic material, and all surfaces of the lenses are aspherical surfaces.

20. The small lens system according to claim 14, wherein an absolute value of a ratio of an effective-diameter outermost thickness (et6) to a center thickness (ct6) of the sixth lens satisfies 0.5<|et6/ct6|<1.2.

21. The small lens system according to claim 14, wherein an angle (A) between an image-side surface of the fourth lens and the optical axis in the vicinity of the optical axis satisfies 85°<A<95°.

22. The small lens system according to claim 14, wherein an angle (A) between an object-side surface of the fifth lens and the optical axis in the vicinity of the optical axis satisfies 85°<A<95°.

23. The small lens system according to claim 14, wherein the small lens system has a field of view greater than 70 degrees.

24. The small lens system according to claim 14, wherein an absolute value of a ratio of a focal distance (f1) of the first lens to a focal distance (F) of the entire lens system satisfies 10000<|f1/F|.

25. The small lens system according to claim 14, wherein a ratio of an effective-diameter outermost distance (et12) between the first lens and the second lens to a center distance (ct12) between the first lens and the second lens satisfies 3<et12/ct12<7.

26. The small lens system according to claim 14, wherein an Abbe number (V1) of the first lens, an Abbe number (V2)

of the second lens, an Abbe number (V3) of the third lens, an Abbe number (V4) of the fourth lens, an Abbe number (V5) of the fifth lens, an Abbe number (V6) of the sixth lens, and an Abbe number (V7) of the seventh lens satisfy $50<V1<60$, $50<V2<60$, $15<V3<30$, $15<V4<30$, $50<V5<60$, $15<V6<30$, and $50<V7<60$, respectively.

* * * * *